(12) United States Patent
Lingard et al.

(10) Patent No.: US 11,168,988 B2
(45) Date of Patent: Nov. 9, 2021

(54) INDOOR MAPPING WITH INERTIAL TRACKING

(71) Applicant: Bose Corporation, Framingham, MA (US)

(72) Inventors: Brian Scott Lingard, Shrewsbury, MA (US); Tanvi Rajesh Daga, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 149 days.

(21) Appl. No.: 16/665,509

(22) Filed: Oct. 28, 2019

(65) Prior Publication Data

US 2021/0123745 A1  Apr. 29, 2021

(51) Int. Cl.
*G01C 21/20* (2006.01)
*G01C 21/16* (2006.01)

(52) U.S. Cl.
CPC ........... *G01C 21/206* (2013.01); *G01C 21/16* (2013.01)

(58) Field of Classification Search
CPC .............................. G01C 21/206; G01C 21/16
See application file for complete search history.

(56) References Cited

U.S. PATENT DOCUMENTS

| | | | |
|---|---|---|---|
| 2013/0253818 A1* | 9/2013 | Sanders | G01S 5/0236 701/419 |
| 2014/0256356 A1* | 9/2014 | Shen | H04W 4/023 455/456.3 |
| 2017/0370728 A1* | 12/2017 | Kordari | G01C 21/383 |

* cited by examiner

*Primary Examiner* — Anne Marie Antonucci
(74) *Attorney, Agent, or Firm* — Hoffman Warnick LLC

(57) ABSTRACT

Various implementations include computing devices and related computer-implemented methods for developing and/or refining maps of indoor spaces. Certain implementations include a method including: receiving inertial measurement unit (IMU) tracking data about a plurality of users traversing an indoor space; identifying at least one path of common travel for the plurality of users within the indoor space based upon the IMU tracking data; and generating a map of the indoor space, the map including a set of boundaries defining the at least one path of common travel.

20 Claims, 6 Drawing Sheets

INDOOR MAPPING WITH INERTIAL TRACKING

TECHNICAL FIELD

This disclosure generally relates to mapping. More particularly, the disclosure relates to approaches for developing and refining maps of indoor spaces using inertial tracking data, such as inertial tracking data from wearable devices.

BACKGROUND

Pedestrian dead reckoning is the process of calculating a current position of a user based upon a previously determined position and a known or estimated rate of travel from that previously determined position. Pedestrian dead reckoning can have various applications, for example, aiding users with navigation, making social connections, facilitating commercial transactions, etc. However, conventional approaches for pedestrian dead reckoning are inadequate for indoor spaces, where map data is often unavailable and global positioning system (GPS) data is unreliable.

SUMMARY

All examples and features mentioned below can be combined in any technically possible way.

Various implementations include computer-implemented methods and computing devices for mapping indoor spaces. Certain implementations include approaches for generating a map of indoor space using inertial data gathered from a group of users.

In some particular aspects, a computer-implemented method includes: receiving inertial measurement unit (IMU) tracking data about a plurality of users traversing an indoor space; identifying at least one path of common travel for the plurality of users within the indoor space based upon the IMU tracking data; and generating a map of the indoor space, the map including a set of boundaries defining the at least one path of common travel.

In other particular aspects, a computing device includes: a processor; a memory coupled to the processor; and a software program stored on the memory, which, when executed by the processor, causes the processor to: receive inertial measurement unit (IMU) tracking data about a plurality of users traversing an indoor space, where the IMU tracking data is detected by an IMU at a wearable device worn by the plurality of users over a period; identify at least one path of common travel for the plurality of users within the indoor space based upon the IMU tracking data; and generate a map of the indoor space, the map including a set of boundaries defining the at least one path of common travel.

Implementations may include one of the following features, or any combination thereof.

In some cases, the method further includes receiving additional IMU tracking data about an additional plurality of users traversing the indoor space, the additional IMU tracking data indicating a deviation on the at least one path of common travel.

In particular aspects, the method further includes refining the map of the indoor space based upon the deviation on the at least one path of common travel, where refining the map includes adjusting a position of at least one of the set of boundaries.

In certain implementations, the set of boundaries are proximate to the at least one path of common travel.

In some aspects, global positioning system (GPS) data is inaccurate in identifying the at least one path of common travel within the indoor space.

In particular cases, the IMU tracking data is received from a wearable device that is worn or otherwise carried by each of the plurality of users while traversing the indoor space.

In certain aspects, the wearable device includes a wearable audio device.

In particular cases, the method further includes: detecting a triggered audio pin with a known location proximate the wearable audio device; estimating a location of each wearable audio device triggering the audio pin based upon the known location of the audio pin and a known range of the audio pin; and refining the map of the indoor space based upon the estimated location of each wearable audio device.

In some implementations, the plurality of users includes a dataset of at least 50 users.

In certain aspects, the method further includes filtering the IMU tracking data to remove anomalous data prior to generating the map of the indoor space.

In particular cases, the indoor space includes a plurality of levels, and the path of common travel includes a plurality of paths within the indoor space.

In some aspects, the path of common travel is defined by a deviation from a mean of the IMU tracking data about the plurality of users traversing the indoor space.

In certain implementations, the method further includes translating the map of the indoor space into audio navigation instructions for output at a wearable audio device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
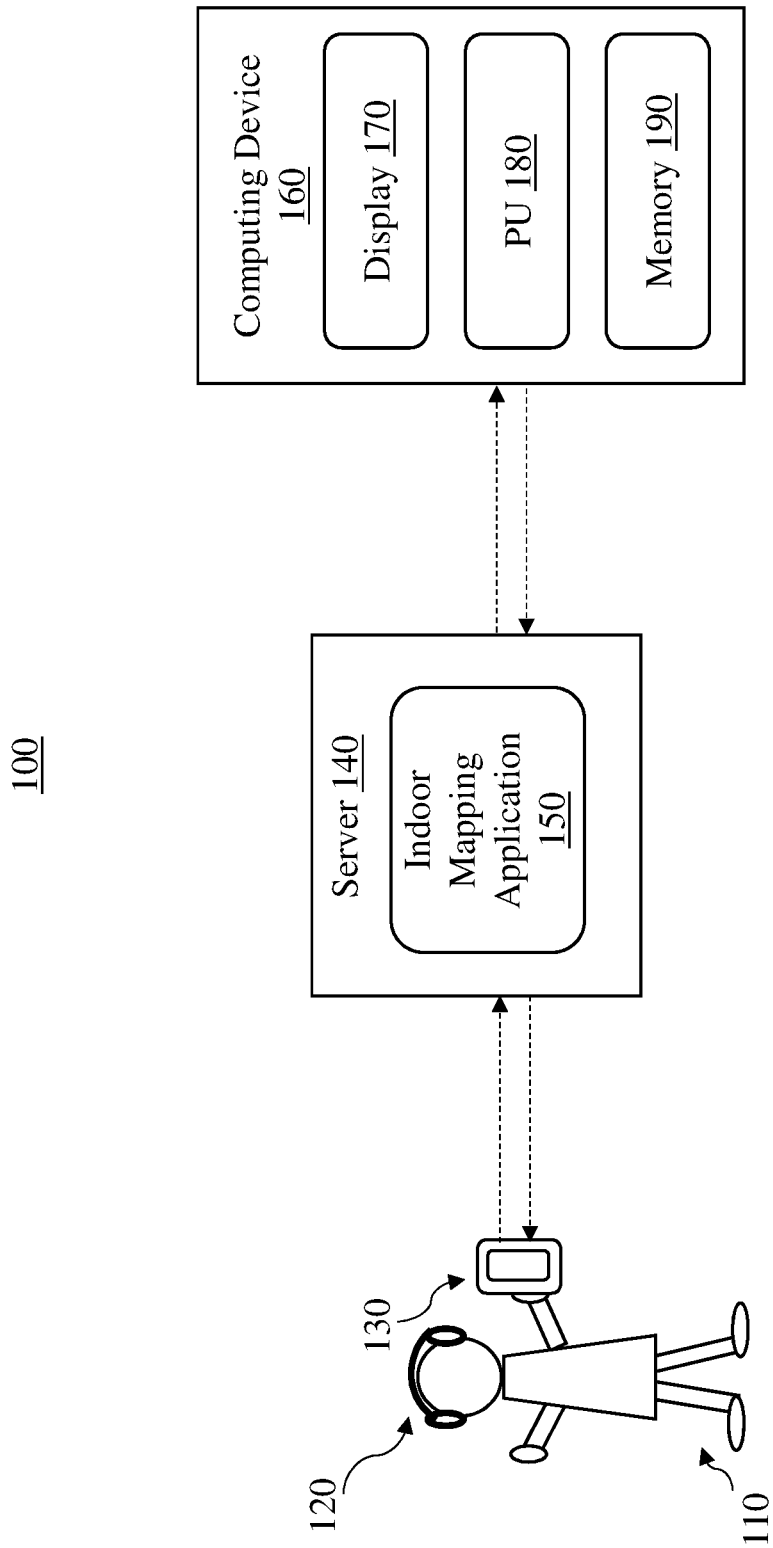
FIG. 1 is a data flow diagram illustrating interaction between devices in an environment according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a map of an indoor space can be generated using crowd-sourced inertial measurement data from a set of users.

Certain implementations include devices and approaches for generating a map of an indoor space based upon inertial measurement unit (IMU) tracking data received from devices worn or otherwise carried by the set of users as they traverse the indoor space. In more particular implementations, the IMU tracking data is received from wearable audio devices worn by the set of users.

As noted herein, conventional approaches for dead reckoning (e.g., pedestrian dead reckoning) in indoor spaces suffer from insufficient information about the indoor space, as well as unreliable positioning data, e.g., global positioning system (GPS) data. The various implementations disclosed herein address these issues by effectively mapping indoor space(s) using IMU tracking data from devices such as wearable (e.g., audio) devices that many users regularly carry.

Commonly labeled components in the FIGURES are considered to be substantially equivalent components for the purposes of illustration, and redundant discussion of those components is omitted for clarity.

Various implementations include a computing device for generating and refining a map of indoor space. FIG. 1 illustrates an example environment 100, including a user 110 and a device 120. In particular examples, the device 120 is an audio device such as a wearable audio device. In various implementations, the device 120 is referred to herein as an audio device. While the audio device 120 is illustrated in this example as a wearable audio device (e.g., headphones, earphones, audio glasses, open-ear audio devices, shoulder-worn speakers or wearable speakers), the audio device 120 can include any conventional audio device such as a portable speaker, smart speaker, etc. In some implementations, the audio device 120 is connected with a smart device 130. However, in other implementations, the audio device 120 can have integrated smart device capabilities (e.g., communications and data processing), such that a distinct smart device 130 is not necessary to perform functions described herein. The audio device 120 and/or the smart device 130 include various sensors, data from which can be used according to various implementations to map indoor space (s). In particular implementations, the audio device 120 and/or the smart device includes a microelectromechanical systems (MEMS) device that combines a multi-axis accelerometer, gyroscope, and/or magnetometer (sometimes referred to as an IMU or inertial measurement unit). While orientation tracking and/or motion detection using an IMU is described according to various implementations, additional or alternative sensors can be used to provide feedback about user orientation and/or movement, e.g., optical tracking systems such as cameras or light detection and ranging (LIDAR) systems, and/or acoustic-based tracking systems.

As noted herein, in still other examples, the device 120 can be any wearable device with one or more sensors and processors configured to perform functions described with respect to the audio device. In these examples, the device 120 is a wearable smart device having one or more capabilities of the smart devices described herein.

In particular cases, the smart device 130 includes a smart phone, smart watch or other wearable smart device, portable computing device, etc., and has an audio gateway, processing components, and one or more wireless transceivers for communicating with other devices in the environment 100. For example, the wireless transceiver(s) can be used to communicate with the audio device (or another wearable device) 120, as well as one or more connected smart devices within communications range. The wireless transceivers can also be used to communicate with a server 140 hosting a mobile application that is running on the smart device 130, for example, an indoor mapping application 150. The server 140 can include a cloud-based server, a local server or any combination of local and/or distributed computing components capable of executing functions described herein. In various particular implementations, the server 140 is a cloud-based server configured to host the indoor mapping application 150, e.g., running on the smart device 130. According to some implementations, the indoor mapping application 150 is downloaded to the user's smart device 130 in order to enable functions described herein. In certain cases, the server 140 is connected with a computing device 160 that enables coding of the indoor mapping application 150, e.g., by a software developer or other programmer.

In some example implementations, the computing device 160 is the same device as the smart device 130, and/or is an integral device within the smart device 130. In other example implementations, the computing device 160 is a device that is distinct from the smart device 130. In additional example implementations, the computing device 160 can include a cloud-based computing system that is accessible via a smart device (e.g., smart device 130) or other local computing device, e.g., via a web browser. In various implementations, the computing device 160 includes a display 170. In certain implementations, the display 170 includes a user interface such as a touch screen, graphical user interface or other visual interface. In cases where the computing device 160 is a smart device such as a smartphone or tablet, the display 170 includes the screen on that smart device. In other cases, the computing device 160 can include a PC, a smart television, a surface computing machine, etc., and the display 170 can be a separate physical device such as a monitor or projection screen. The computing device 160 can also include a processor (PU) 180 to execute instructions for generating a map of an indoor environment. In some cases, a memory 190 is coupled with the processor (PU) 180 to store the instructions. In other implementations, the processor 180 can otherwise access the instructions, e.g., from a remote storage system connected with the computing device 160. When executed by the processor 180, the instructions cause the processor 180 to generate and/or refine a map of an indoor environment. In some cases, the instructions are part of the indoor mapping application 150, which can be accessed via the server 140 or locally stored in memory 190.

The memory 190 can include, for example, flash memory and/or non-volatile random access memory (NVRAM). In some implementations, instructions (e.g., software such as the indoor mapping application 150) are stored in an information carrier. The instructions, when executed by one or more processing devices (e.g., the processor 180), perform one or more processes, such as those described elsewhere herein. The instructions can also be stored by one or more storage devices, such as one or more (e.g. non-transitory) computer- or machine-readable mediums (for example, the memory, or memory on the processor). As described herein, the memory 190 can include instructions, or the processor 180 can otherwise access instructions for generating and/or refining a map of an indoor space according to various particular implementations. It is understood that portions of the memory (e.g., instructions) can also be stored in a remote location or in a distributed location, and can be fetched or otherwise obtained by the processor 180 (e.g., via any communications protocol described herein) for execution.

It is further understood that any components in the computing device 160, including components capable of storing and/or executing software instructions such as the indoor mapping application 150, can be included in the smart device 130 and/or the device 120 (e.g., wearable device and/or wearable audio device). Additionally, the components and associated functions described with reference to the wearable (e.g., audio) device 120, smart device 130 and/or computing device can be combined into a single device such as any of those devices or another smart device described herein.

Figure 2:
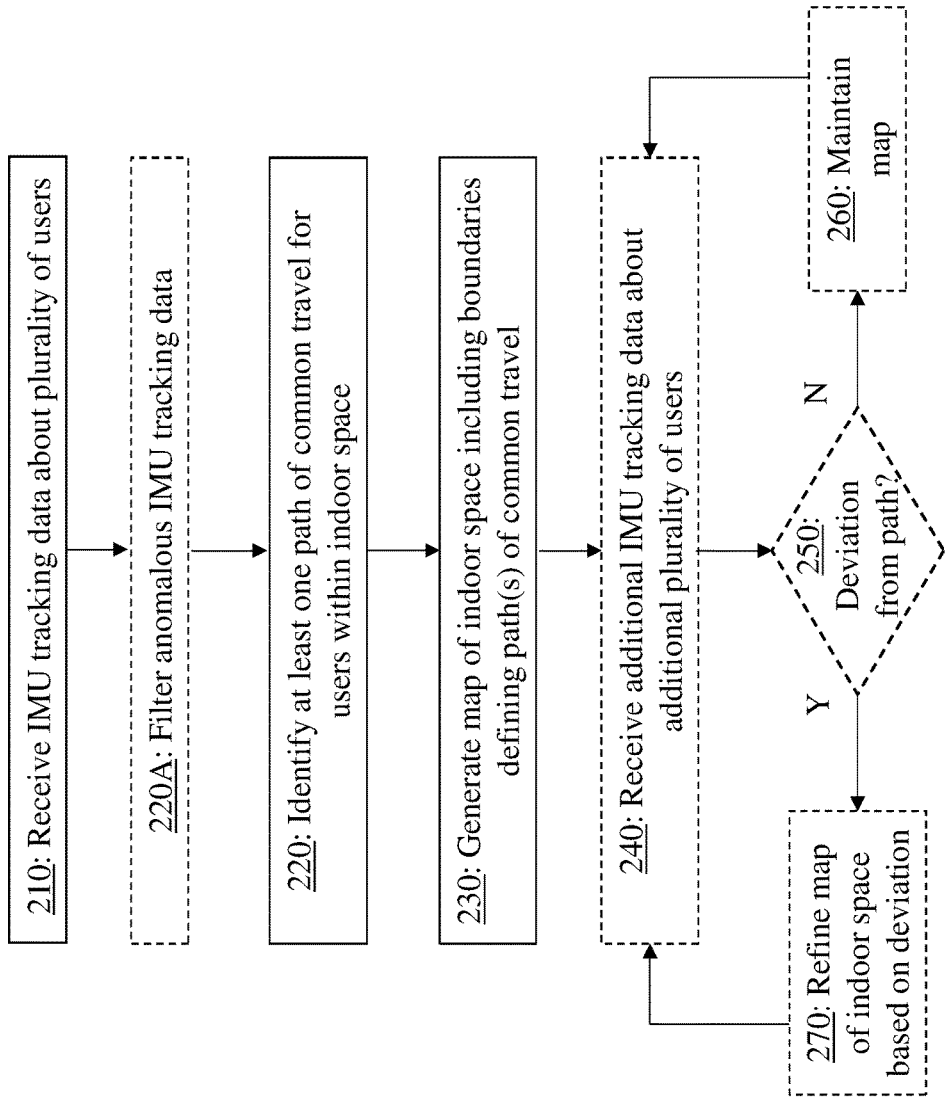
FIG. 2 is a flow diagram illustrating processes in a method of mapping an indoor space according to various implementations.

FIG. 2 is a process flow diagram illustrating a computer-implemented method performed by the indoor mapping application 150 (FIG. 1), or other instructions executed by the processor 180, according to various implementations. These processes are described with continuing reference to FIG. 1, as well as reference to the example schematic depictions of map estimates illustrated in FIGS. 3-5. In some cases, as described herein, processes shown sequentially can be performed simultaneously, or nearly simultaneously. However, in other cases, these processes can be performed in a different order.

Figure 3:
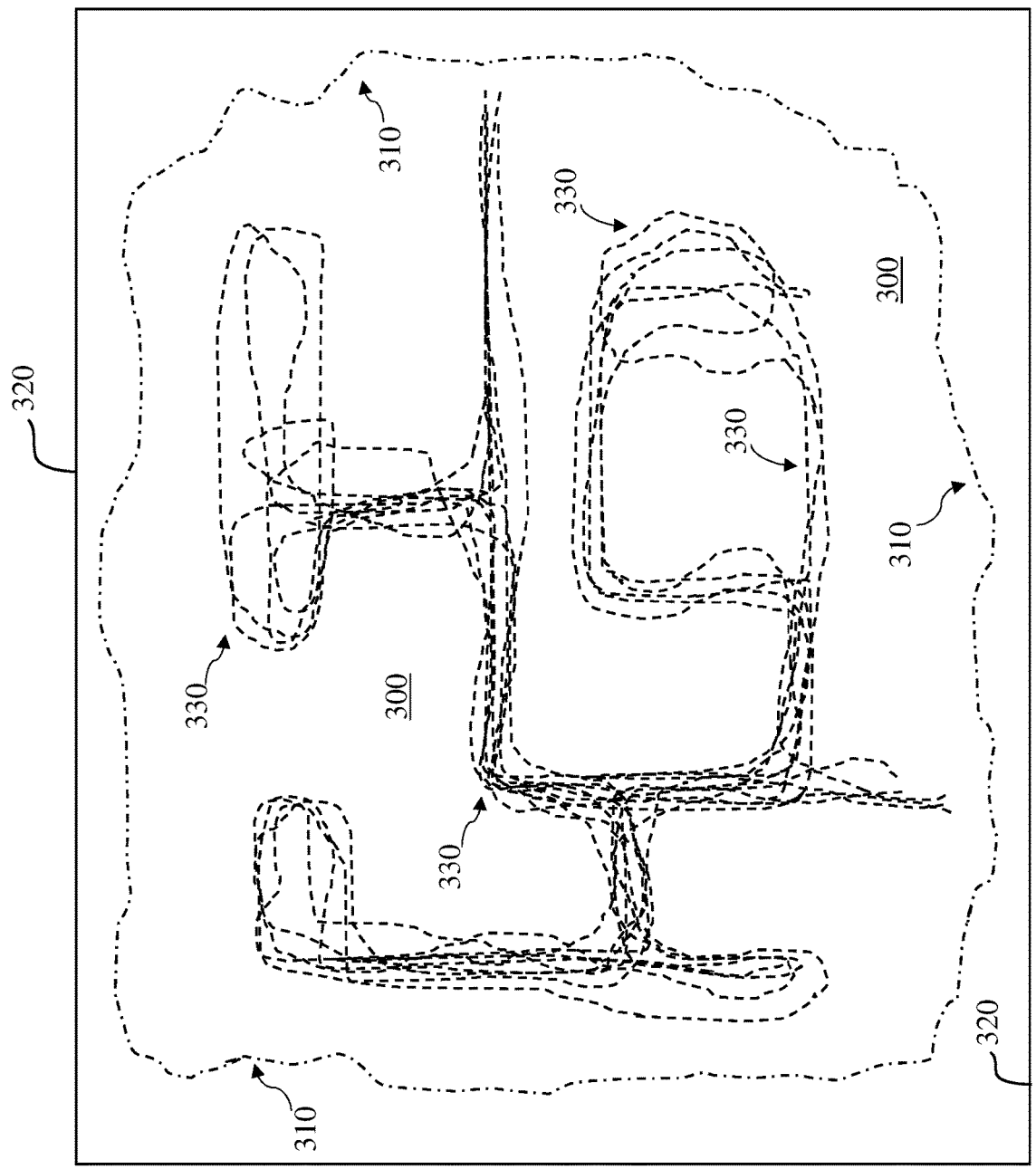
FIG. 3 is a schematic illustration of processes in mapping an indoor space from the flow diagram of FIG. 2.

In a first process (FIG. 2), the indoor mapping application 150 receives IMU tracking data about a plurality of users traversing an indoor space. FIG. 3 is a schematic depiction of an indoor space 300, for example an office building, a museum, a shopping mall, a sporting arena, a grocery store, etc. The indoor space 300 is shown with a generalized boundary 310, which may be extrapolated from known GPS coordinates of the building (or structure) 320 that houses the indoor space 300, photographs taken of the outside of the building, etc. That is, while in some cases the precise location and dimension of the outside of the building 320 housing the indoor space 300 is known, the boundary 310 of the indoor space 300 within that building 320 can often only be estimated (or, extrapolated) based on characteristics of the building 320. For example, the boundary 310 of the indoor space 300 can be estimated using the known location and dimension of the building 320, along with estimates accounting for doorways, entryways, walls of varying thickness, conduits for heating/cooling systems, water and waste, etc. As such, the boundary 310 depicted in FIG. 3 is merely an example.

As users 110 traverse the indoor space 300 wearing the audio device 120 and/or carrying or otherwise toting the smart device 130 (FIG. 1), the IMU in these devices is configured to transmit IMU tracking data (shown as data points 330, FIG. 3) about user movement to one or more local data stores, to the server 140 running the indoor mapping application 150, and/or to the memory 190 in the computing device 160. The indoor mapping application 150 is configured to retrieve the IMU tracking data (data points 330) from one or more of these sources, or can receive the IMU tracking data directly from the audio device 120 and/or smart device 130. The IMU tracking data provides information about movement of each user 110 within the indoor space, e.g., location information over time, changes in position, acceleration, etc. In various implementations, these data points 330 represent estimated locations of the users 110 within the indoor space 300, for example, based upon detected changes in direction and/or acceleration.

Figure 4:
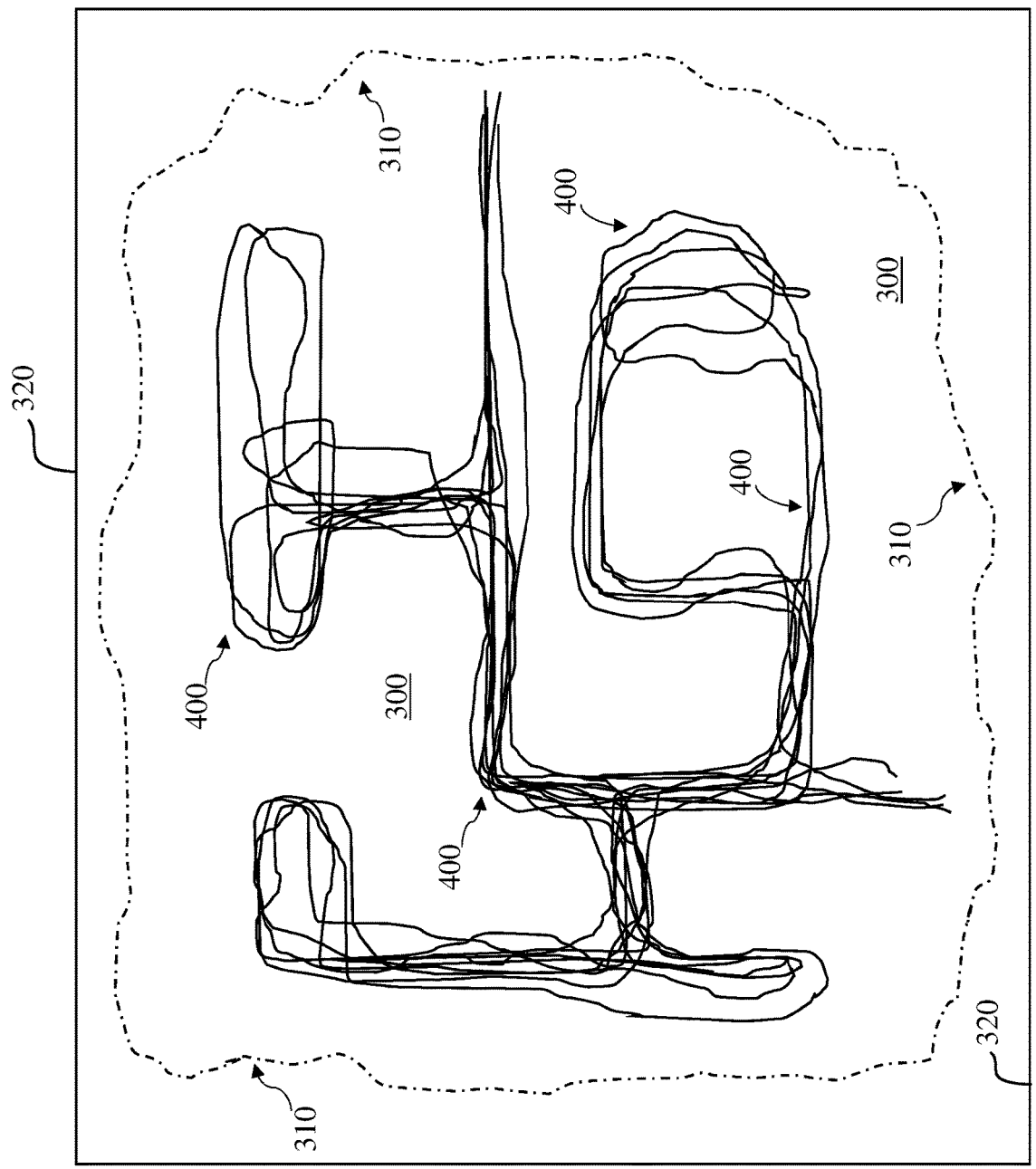
FIG. 4 illustrates an additional process in mapping an indoor space from the flow diagram of FIG. 2.

With reference to FIGS. 3 and 4, and continuing reference to FIG. 2, based upon the received IMU tracking data (points 330) about users 110 traversing the indoor space 300, the indoor mapping application 150 identifies at least one path of common travel for those users 110 (process 220, FIG. 2). A number of example paths (of common travel) 400 are illustrated in FIG. 4. In this example, each path 400 represents the movement of at least one user 110 within the indoor space 300. In some examples, each path 400 represents a single user 110 traversing the indoor space 300. In certain implementations, each path (of common travel) 400 is defined by a deviation from a mean of the IMU tracking data (data points 300) about the plurality of users 110 traversing the indoor space 300. In example cases, each path 400 represents a best fit statistical approximation of the movement of a set of users 110, e.g., groups of users intersecting a common set of locations within the indoor space 300 such that the statistical variation of any one user 110 from the mean of the set is less than approximately 1-2 standard deviations (e.g., with data from at least approximately 50 users). That is, while several paths 400 or more are shown in FIG. 4, it is understood that these paths 400 can represent the movement of several dozen users or more. In various implementations, the data set of users 110 required to verify at least one path 400 is at least approximately 50 users. In more particular cases, the indoor mapping application 150 determines a path 400 using IMU tracking data from at least 60, 70, 80, 90 or 100 users. Because the indoor space 300 is located inside the building 320, e.g., under a roof or other signal-interfering structure, GPS data about the location of the audio device 120 and/or smart device 130 is inaccurate in identifying the path(s) 400, e.g., with error rates greater than approximately ten to twenty percent (e.g., in some cases with error rates as large as the entire span of the building 320). Additionally, a dataset of at least 50 users can be particularly useful in identifying the path(s) 400 because, while IMU tracking data for individual users 110 has greater accuracy than GPS data within the indoor space 300, the IMU tracking data can still have error rates up to a few percent. The reliability of the IMU tracking data is enhanced when a significant sample size is obtained, e.g., from dozens of users 110. In these cases, the error rate for the path(s) 400 can be reduced to approximately one percent or less.

In particular implementations, as shown in process 220A in FIG. 2, the indoor mapping application 150 filters the IMU tracking data (data points 330) to remove anomalous data, for example, prior to or during the process of identifying the path(s) 400 of common travel. In certain cases, the anomalous data is characterized by IMU tracking data (e.g., data points 330), and/or a path 400, that deviates from the mean of a data set of all data points 330 or paths 400 by greater than 3 standard deviations.

After identifying path(s) 400, the indoor mapping application 150 is configured to generate a map 500 (FIG. 5) of the indoor space 300 (process 230, FIG. 2). That is, the indoor mapping application 150 is configured to define a set of boundaries 510 (FIG. 5) proximate the path(s) 400 within the indoor space 300. In various implementations, these boundaries 510 can represent interior walls or other structures that prevent or otherwise deter pedestrian traffic (e.g., pillars/columns, fountains, video displays or other interfaces, etc.). These boundaries 510 are defined proximate the path(s) 400, for example, at a defined distance from an outermost path 400. In various implementations, the boundaries 510 are defined by a separation distance (Ds) from the outermost path 400 in a group of paths 400. Because users are unlikely to move within the indoor space 300 while directly contacting the boundaries 510, this separation distance (Ds) can be at least approximately one or two feet (or at least approximately 0.25-0.75 meters). A set of boundaries 510 are shown in the map 500 in FIG. 5, illustrating, for example, corridors 520, rooms 530 off of the corridors 520, and at least one entryway/exit 540.

Figure 5:
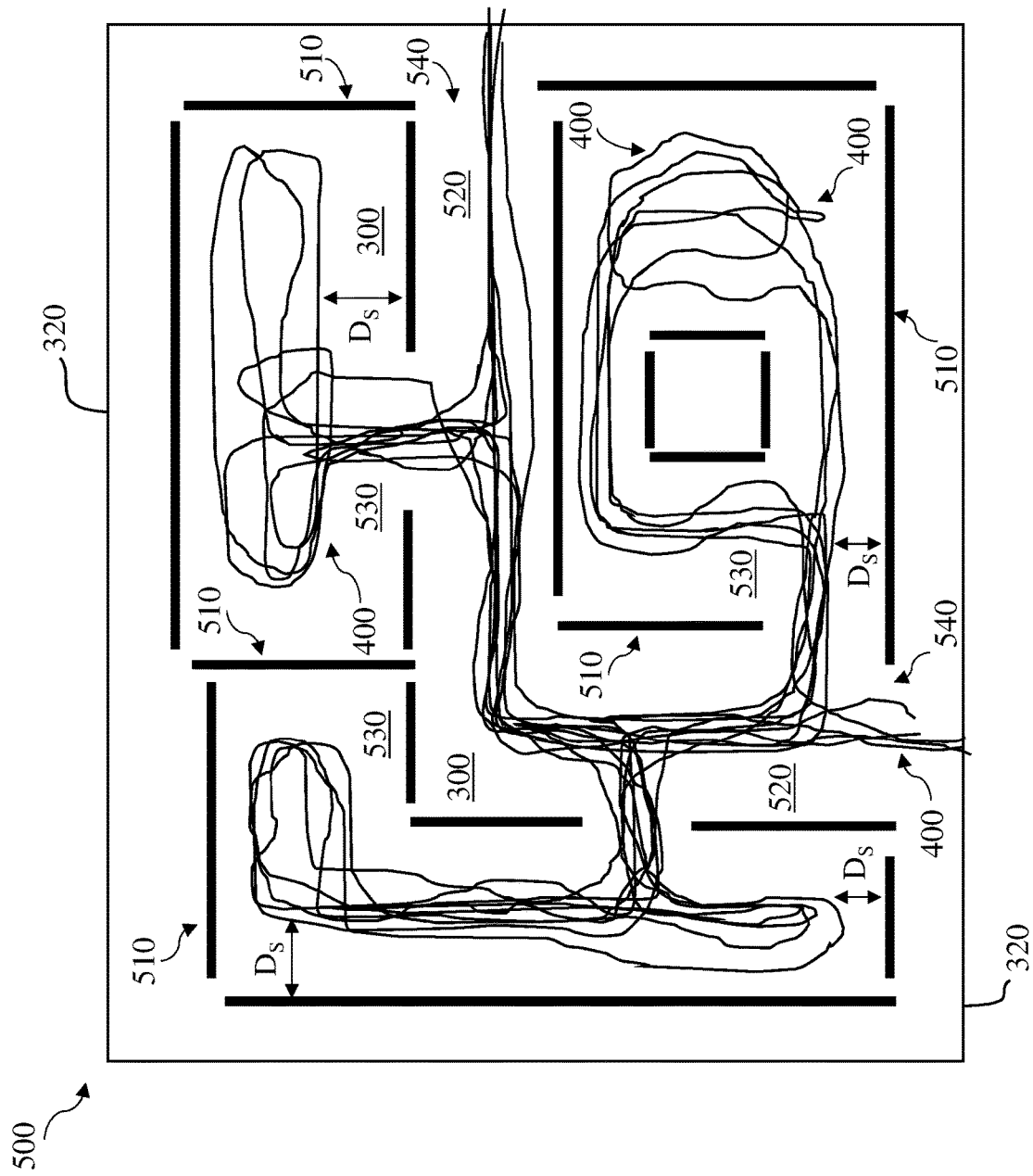
FIG. 5 illustrates an additional process in mapping an indoor space from the flow diagram of FIG. 2.

While a single-level of indoor space 300 is illustrated in FIGS. 3-5 herein, it is understood that the indoor mapping application 150 is also configured to map indoor space(s)

that include a plurality of levels, e.g., floors or stories. In these cases, the map 500 can include a plurality of maps for distinct levels of the indoor space 300, and/or a plurality of paths 400 within the indoor space 300, e.g., paths 400 between levels such as up/down stairs, escalators, elevators, etc. In certain cases, the IMU tracking data indicates a change in level (i.e., altitude) within the indoor space 300, for example, with an acceleration pattern consistent with climbing stairs, riding an escalator and/or riding in an elevator.

Returning to FIG. 2, in various additional implementations, the indoor mapping application 150 is configured to receive additional IMU tracking data about a plurality of additional users traversing the indoor space 300 (process 240). In these cases, the indoor mapping application 150 is configured to compare the additional IMU tracking data (e.g., data points representing locations, movement, direction changes, etc.) from the additional users with the path(s) 400 in the map 500 (Decision 250). If the additional IMU tracking data does not deviate from the already established path(s) 400, the indoor mapping application 150 maintains the map 500, e.g., for use in one or more functions described herein (process 260). In response to determining that the additional IMU tracking data deviates from the path(s) 400, the indoor mapping application 150 is configured to refine the map 500 by adjusting a position of at least one of the boundaries 510 (process 270). For example, where the additional IMU tracking data deviates from the path(s) 400 by greater than a threshold amount (e.g., two to three percent, five percent, ten percent, twenty percent or more), the indoor mapping application 150 refines the map 500 by adjusting one or more boundaries 510 proximate to the data points that deviate from the path(s) 400. In particular cases, the indoor mapping application 150 does not adjust one or more boundaries 510 in the map 500 until a significant data set of deviating (non-anomalous) IMU tracking data is received. In example cases, a significant data set is defined as IMU tracking data received from multiple distinct users, e.g., two, three, four or more distinct users. In these cases, where a significant data set of non-anomalous IMU tracking data deviates from the path(s) 400, the indoor mapping application 150 is configured to refine the map 500 by adjusting a position of at least one of the boundaries 510. In certain implementations, the deviation threshold is updated as additional IMU tracking data about user paths 400 is obtained. For example, the deviation threshold can be set to an initial value (e.g., twenty percent) until non-anomalous data from a defined number of users is received, and after receiving that defined amount of data, the deviation threshold is reduced (e.g., to ten percent, five percent, etc.). The deviation threshold can be further adjusted as additional IMU tracking data about user paths 400 is obtained, e.g., as every X number of samples is obtained. In a particular example, where the additional IMU tracking data includes a non-anomalous data point or set of data points that falls outside the outermost extent of a path 400, the indoor mapping application 150 adjusts the position of a boundary 510 to location that is at least the separation distance (Ds) away from the indicated location of that non-anomalous data, removes an existing boundary 510 and/or generates a new boundary 510 on the map 500. As show in FIG. 2, this process can be repeated for additional IMU tracking data to refine the map 500 over time.

In additional optional implementations, the map 500 can be refined based triggered audio pins or other geo-location triggers that are detectable by the audio device 120 and/or the smart device 130. For example, the indoor mapping application 150 can be configured to detect a triggered audio pin with a known location proximate the user 110 (e.g., proximate the audio device 120 and/or smart device 130), and estimate (and/or verify an established estimate of) a location of the audio device 120 and/or smart device 130 based upon a known location of the audio pin and a known range of the audio pin. With this estimated location information, the indoor mapping application 150 can refine the map 500, e.g., by adjusting the position of one or more boundaries 510, adding and/or subtracting boundaries 510, as discussed herein. In various particular implementations, the indoor mapping application 150 can access additional map data and/or audio pin data (such as from an audio pin or augmented reality (AR) audio application) that indicates the source of the audio pin (e.g., the commercial establishment providing the audio pin, or the geolocation of the audio pin left ("dropped") by another user) as well as a range of the audio pin (e.g., several meters or more). Additional information about audio pins, triggering audio pins, and detecting range can be found in U.S. patent application Ser. No. 16/267,643 (Location-Based Personal Audio, filed on Feb. 5, 2019) and Ser. No. 16/289,940 (Augmented Reality Audio Playback Control, filed on Mar. 1, 2019), each of which is herein incorporated by reference in its entirety. Based upon the known location of the audio pin and the known range of that audio pin, the indoor mapping application 150 estimates a location of the user 110 (e.g., audio device 120 and/or smart device 130), e.g., by triangulating with two or more detected audio pins based upon known locations and ranges of those pins.

Figure 6:
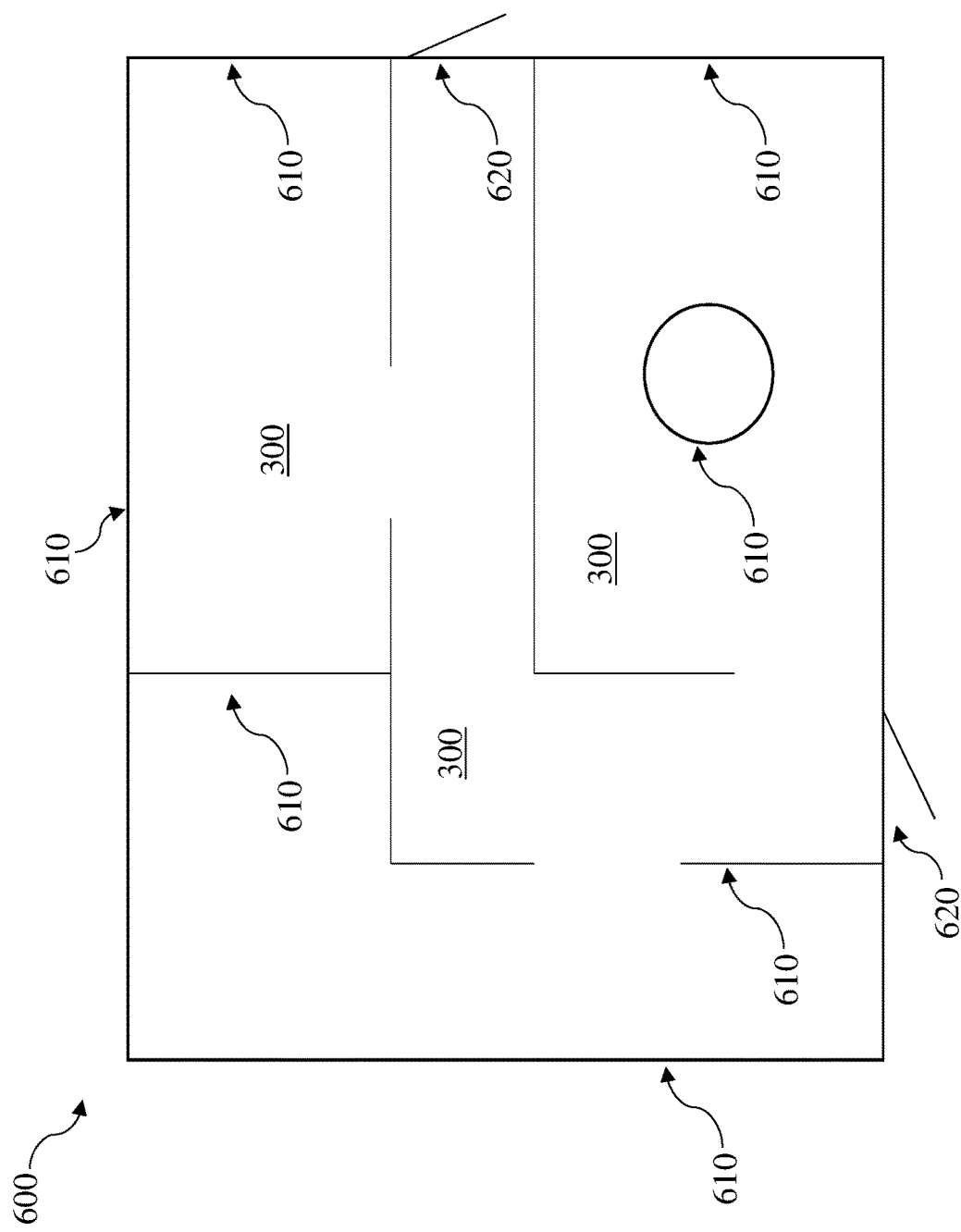
FIG. 6 is an example of a reference map used to refine a mapping process such as those described with reference to FIGS. 2-5, according to various implementations.

FIG. 6 shows an example of an actual map 600 of the indoor space 300 that is approximated by the map 500 generated (and in some cases, refined) in processes 210-270 (FIG. 2). As described herein, the indoor mapping application 150 includes logic for performing a number of functions. In various implementations, the indoor mapping application 150 includes logic for identifying paths 400 and defining boundaries 500 proximate those paths. In certain implementations, the logic in the indoor mapping application 150 includes pattern recognition logic and/or a machine learning engine for identifying paths 400 and defining boundaries 500 proximate those paths 400 (FIG. 5) using feedback from actual maps of indoor space (e.g., map 600, FIG. 6). For example, in certain cases, the logic in the indoor mapping application 150 is configured to receive data indicating the coordinate data (e.g., location) of known boundaries 610 (e.g., walls, columns/pillars) as well as entryways/exits 620 in a map 600 of an indoor space 300 that has been mapped. In these cases, the indoor mapping application 150 is configured to increase a priority of input data (e.g., data points 330) in identifying paths and/or defining boundaries 500 based upon the known boundaries 610 in the map 600. This logic can be refined periodically and/or on a continuous basis to update rules for mapping indoor spaces based upon paths of common travel. One or more of these logic components includes an artificial intelligence (AI) component for iteratively refining logic operations to enhance the accuracy of its results. Example AI components include machine learning logic, a neural network including an artificial neural network, a deep learning engine, etc. It is further understood that logic components in the indoor mapping application 150 can be interconnected in such a manner that these components act in concert or in reliance upon one another.

In various additional implementations, the indoor mapping application 150 is further configured to translate the map 500 (FIG. 5) of the indoor space 300 into audio navigation instructions for output, e.g., at a wearable audio device such as the audio device 120. In these cases, map 500, including absolute and/or relative locations of boundaries 510 can be translated into speech for guiding a user through the indoor space 300. In certain implementations, the indoor mapping application 150 allows users to define how audio navigation instructions are delivered, in terms of frequency, scope and/or reaction to other sensor inputs. In certain examples, the indoor mapping application 150 provides audio navigation instructions (e.g., at audio device 120) in response to detecting entry into an indoor space 300, without user prompting. In other examples, the indoor mapping application 150 will not begin outputting audio navigation instructions unless prompted by the user, e.g., with a user interface prompt such as a voice command or gesture-based command. In any case, the audio navigation instructions may be particularly beneficial for visually impaired users attempting to navigate indoor spaces, where acoustic queues may not provide as much context as open-air environments, and where GPS data cannot provide accurate location information on its own.

The various implementations disclosed herein enable effective and reliable mapping of indoor spaces. These maps can be used for a variety of purposes, for example, providing navigation instructions for the visually impaired, enabling users to locate one another in crowded and/or large indoor venues, enabling localized content delivery with greater accuracy, reducing emergency response times, etc. The indoor mapping application 150 is configured to use readily available inertial tracking data from devices that are already regularly worn or otherwise carried by a significant portion of the population, thereby enabling greater accuracy in building and refining maps of indoor spaces. In any case, the indoor mapping application 150 (FIG. 1) has the technical effect of mapping indoor spaces to improve pedestrian dead reckoning.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:
1. A computer-implemented method comprising:
receiving inertial measurement unit (IMU) tracking data about a plurality of users traversing an indoor space;
identifying at least one path of common travel for the plurality of users within the indoor space based upon the IMU tracking data;
generating a map of the indoor space, the map comprising a set of boundaries defining the at least one path of common travel;
receiving additional IMU tracking data about an additional plurality of users traversing the indoor space, the additional IMU tracking data indicating a deviation on the at least one path of common travel; and
refining the map of the indoor space based upon the deviation on the at least one path of common travel, wherein refining the map comprises adjusting a position of at least one of the set of boundaries.

2. The computer-implemented method of claim 1, wherein the set of boundaries are proximate to the at least one path of common travel, and wherein global positioning system (GPS) data is inaccurate in identifying the at least one path of common travel within the indoor space.

3. The computer-implemented method of claim 1, wherein the IMU tracking data is received from a wearable device that is worn or otherwise carried by each of the plurality of users while traversing the indoor space.

4. The computer-implemented method of claim 3, wherein the wearable device worn or otherwise carried by at least one of the plurality of users comprises a wearable audio device, wherein the method further comprises:
detecting a triggered audio pin with a known location proximate the wearable audio device;
estimating a location of each wearable audio device triggering the audio pin based upon the known location of the audio pin and a known range of the audio pin; and
refining the map of the indoor space based upon the estimated location of each wearable audio device.

5. The method of claim 4, wherein the known location of the audio pin is used to estimate the location of the wearable audio device that triggers the audio pin, and wherein the previously generated map of the indoor space is refined based on the estimated location of the wearable audio device that triggers the audio pin.

6. The computer-implemented method of claim 1, further comprising filtering the IMU tracking data to remove anomalous data prior to generating the map of the indoor space, wherein the plurality of users comprises a dataset of at least 50 users.

7. The computer-implemented method of claim 1, wherein the indoor space comprises a plurality of levels, and wherein the at least one path of common travel comprises a plurality of paths within the indoor space.

8. The computer-implemented method of claim 1, wherein the path of common travel is defined by a deviation from a mean of the IMU tracking data about the plurality of users traversing the indoor space.

9. The computer-implemented method of claim 1, further comprising translating the map of the indoor space into audio navigation instructions for output at a wearable audio device.

10. The method of claim 9, further comprising, for a user wearing the wearable audio device:
outputting the audio navigation instructions with at least one transducer at the wearable audio device in response to detecting that the wearable audio device has entered the indoor space.

11. The method of claim 10, wherein the audio navigation instructions are output with the at least one transducer without prompting from the user.

12. The method of claim 1, wherein the additional plurality of users is distinct from the plurality of users, and wherein the additional IMU tracking data about the additional plurality of users traversing the indoor space is received after receiving the IMU tracking data about the plurality of users traversing the indoor space and generating the map of the indoor space.

13. A computing device comprising:
a processor;
a memory coupled to the processor; and
a software program stored on the memory, which, when executed by the processor, causes the processor to:
receive inertial measurement unit (IMU) tracking data about a plurality of users traversing an indoor space, wherein the IMU tracking data is detected by an IMU at a wearable device worn by the plurality of users over a period;
identify at least one path of common travel for the plurality of users within the indoor space based upon the IMU tracking data;
generate a map of the indoor space, the map comprising a set of boundaries defining the at least one path of common travel;
receive additional IMU tracking data about an additional plurality of users traversing the indoor space, the additional IMU tracking data indicating a deviation on the at least one path of common travel; and
refine the map of the indoor space based upon the deviation on the at least one path of common travel, wherein refining the map comprises adjusting a position of at least one of the set of boundaries.

14. The computing device of claim 13, wherein the set of boundaries are proximate to the at least one path of common travel,
wherein the path of common travel is defined by a deviation from a mean of the IMU tracking data about the plurality of users traversing the indoor space,
wherein the plurality of users comprises a dataset of at least 50 users, and
wherein the path of common travel is defined by a deviation from a mean of the IMU tracking data about the plurality of users traversing the indoor space.

15. The computing device of claim 13, wherein the processor is further configured to translate the map of the indoor space into audio navigation instructions for output by at least one transducer at the wearable device.

16. The computing device of claim 15, wherein the wearable device comprises a wearable audio device, and wherein the processor is further configured to output the audio navigation instructions with the at least one transducer at the wearable audio device in response to detecting that the wearable audio device has entered the indoor space.

17. The computing device of claim 16, wherein the processor outputs the audio navigation instructions with the at least one transducer without prompting from the user.

18. The computing device of claim 13, wherein the additional plurality of users is distinct from the plurality of users, and wherein the additional IMU tracking data about the additional plurality of users traversing the indoor space is received after receiving the IMU tracking data about the plurality of users traversing the indoor space and generating the map of the indoor space.

19. A computer-implemented method comprising:
receiving inertial measurement unit (IMU) tracking data about a plurality of users traversing an indoor space, wherein the IMU tracking data is received from a wearable audio device that is worn or otherwise carried by each of the plurality of users while traversing the indoor space;
identifying at least one path of common travel for the plurality of users within the indoor space based upon the IMU tracking data;
generating a map of the indoor space, the map comprising a set of boundaries defining the at least one path of common travel;
receiving additional IMU tracking data about an additional plurality of users traversing the indoor space, the additional IMU tracking data indicating a deviation on the at least one path of common travel;
detecting a triggered audio pin with a known location proximate the wearable audio device;
estimating a location of each wearable audio device triggering the audio pin based upon the known location of the audio pin and a known range of the audio pin;
refining the map of the indoor space based upon the estimated location of each wearable audio device and the deviation on the at least one path of common travel from the additional IMU tracking data, wherein refining the map comprises adjusting a position of at least one of the set of boundaries;
translating the refined map of the indoor space into audio navigation instructions for output with at least one transducer at the wearable audio device or a distinct wearable audio device; and
outputting the audio navigation instructions with at least one transducer at the wearable audio device or the distinct wearable audio device in response to detecting that the wearable audio device or the distinct wearable audio device has entered the indoor space.

20. The method of claim 19, wherein the additional plurality of users is distinct from the plurality of users, and wherein the additional IMU tracking data about the additional plurality of users traversing the indoor space is received after receiving the IMU tracking data about the plurality of users traversing the indoor space and generating the map of the indoor space.

* * * * *